United States Patent
Kim et al.

(10) Patent No.: US 7,645,398 B2
(45) Date of Patent: Jan. 12, 2010

(54) PRESSURE SENSOR FOR ELECTRONIC SKIN AND FABRICATION METHOD OF PRESSURE SENSOR FOR ELECTRONIC SKIN

(75) Inventors: Seong-Hyun Kim, Daejeon (KR); Taehyoung Zyung, Daejeon (KR); Jae Bon Koo, Daejeon (KR); Jung Hun Lee, Daejeon (KR); Sang Chul Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 575 days.

(21) Appl. No.: 11/635,067

(22) Filed: Dec. 7, 2006

(65) Prior Publication Data

US 2007/0131529 A1   Jun. 14, 2007

(30) Foreign Application Priority Data

Dec. 7, 2005   (KR) .................. 10-2005-0118948
Mar. 27, 2006  (KR) .................. 10-2006-0027358

(51) Int. Cl.
*H01B 1/00* (2006.01)
*G01D 7/00* (2006.01)
*G01L 3/00* (2006.01)

(52) U.S. Cl. ............... 252/500; 73/862.041; 73/862.046
(58) Field of Classification Search ............ 252/500; 73/862.041, 62.468
See application file for complete search history.

(56) References Cited

U.S. PATENT DOCUMENTS 5,010,774 A   4/1991   Kikuo et al.

FOREIGN PATENT DOCUMENTS

| JP | 19830106668 | 6/1983 |
|---|---|---|
| JP | 19840178301 | 10/1984 |
| JP | 62-168440 | 7/1987 |
| JP | 62169031 A * | 7/1987 |
| JP | 04-286928 | 10/1992 |
| JP | 05-099766 | 4/1993 |
| JP | 06-160215 | 6/1994 |
| JP | 11-050825 | 2/1999 |
| JP | 2005-351653 | 12/2005 |
| KR | 2001-01 0525 | 11/2001 |
| WO | 00/33047 | 6/2000 |

OTHER PUBLICATIONS

Someya et al: "Conformable, flexible, large-area networks of pressure and thermal sensors with organic transistor active matrixes"; PNAS; Aug. 30, 2005; pp. 12321-12325.

* cited by examiner

*Primary Examiner*—Mark Kopec
*Assistant Examiner*—Jaison P Thomas
(74) *Attorney, Agent, or Firm*—Lowe Hauptman Ham & Berner, LLP

(57) ABSTRACT

Provided is a pressure sensor for electronic skin. The pressure sensor measures pressure levels, and includes conductive rubber, electrodes, and elastic rubber. The conductive rubber has conductivity that increases when a pressure exceeding a predetermined pressure is applied thereto. The electrodes are formed on either side surface of the conductive rubber to measure current flowing through the conductive rubber. The elastic rubber is formed on a top surface of one of the electrodes to disperse pressure applied to the conductive rubber.

10 Claims, 4 Drawing Sheets

PRESSURE SENSOR FOR ELECTRONIC SKIN AND FABRICATION METHOD OF PRESSURE SENSOR FOR ELECTRONIC SKIN

CROSS-REFERENCE TO RELATED PATENT APPLICATION

This application claims the benefits of Korean Patent Application No. 10-2005-0118948, filed on Dec. 7, 2005, and Korean Patent Application No. 10-2006-0027358, filed on Mar. 27, 2006, in the Korean Intellectual Property Office, the disclosures of which are incorporated herein in their entirety by reference.

BACKGROUND OF THE INVENTION

1. Field of the Invention

The present invention relates to a pressure sensor, and more particularly, to a pressure sensor for electronic skin capable of measuring the amount of pressure applied thereto using pressure-sensitive conductivity, and a manufacturing method thereof.

2. Description of the Related Art

Artificial or electronic skin that uses pressure-sensitive or pressure-activated conductive rubber is being researched and developed. When a predetermined amount of pressure is applied to human skin, not only can the skin sense the application of pressure, but it can also sense the intensity of the pressure. It is important that electronic skin using pressure-activated conductive rubber performs the same functions as human skin.

Pressure-activated conductive rubber, which is used in pressure sensors, gains conductivity when pressure is applied to it and loses conductivity when the pressure is removed.

However, while pressure-activated conductive rubber is apt for use in an on/off type sensor (due to its abrupt build-up and loss of conductivity), it is unsuitable for pressure intensity detection. Accordingly, electronic skin that is manufactured using pressure-activated conductive rubber can sense whether there is pressure applied, but unlike real skin, cannot determine the amount of pressure applied.

FIG. 1 is a schematic view of a conventional pressure sensor using pressure-activated conductive rubber.

Referring to FIG. 1, the conventional pressure sensor includes pressure-activated conductive rubber 1, electrodes 2 and 3, a voltmeter 10, and an ammeter 20.

The pressure-activated conductive rubber 1 is a bendable material that has conductive characteristics by suddenly increasing conductivity when pressure exceeding a predetermined amount is applied thereto.

The electrodes 2 and 3 are respectively formed on either side surface of the pressure-activated conductive rubber 1. After a voltage is applied through the voltmeter 10, whether pressure applies on either side surface of the pressure-activated conductive rubber 1 can be detected by measuring current flowing through the ammeter 20. Specifically, when there is no pressure applied to any area of the surface of either side of the pressure-activated conductive rubber 1, the pressure-activated conductive rubber 1 exhibits insulating characteristics so that current flows through the ammeter 20. Conversely, when a pressure exceeding a predetermined amount is applied to at least one of the two side surfaces of the pressure-activated conductive rubber 1, the pressure-activated conductive rubber 1 displays conductive characteristics, whereby current flows through the ammeter 20. Therefore, the pressure sensor configuration illustrated in FIG. 1 can detect whether pressure applies to either end of the electrodes 2 and 3.

FIG. 2 is a graph illustrating the output characteristics of the pressure sensor of FIG. 1. As shown in FIG. 2, because the pressure-activated conductive rubber 1 decreases its resistance abruptly when a predetermined pressure is applied thereto, the range in which the pressure can be measured is extremely narrow. Accordingly, conventional pressure sensors can only determine if there is an applied pressure, and cannot emulate the ability of human skin to sense the amount of applied pressure. For example, when pressure-activated conductive rubber is installed on robotic fingers for lifting an object (an egg, for example), the object is placed between the fingers, after which the gaps between the object and the fingers are narrowed until the pressure-activated conductive rubber is pressed. Here, if x is the distance that the pressure-activated conductive rubber is depressed and the elastic constant is k, then the following equation 1 may be derived.

$$\text{PRESSURE} = \frac{Kx}{\text{contacted surface area}} \qquad \text{Equation 1}$$

When the pressure applied to the pressure-activated conductive rubber 1 (calculated using Equation 1) is greater than a pressure at which an egg slips and less than the pressure at which the egg cracks, the closing movement of the two robotic fingers is stopped and the egg may be held.

However, if another object that is heavier than an egg (for example, a billiard ball) is to be held after the egg, an alternate pressure sensor must be installed.

SUMMARY OF THE INVENTION

The present invention provides a pressure sensor for electronic skin capable of measuring not only the presence of pressure applied to electrodes on either side surface of a pressure-activated conductive rubber, but also the intensity of the pressure by using pressure dispersing elastic rubber.

According to an aspect of the present invention, there is provided a pressure sensor for electronic skin, including: conductive rubber having a conductivity that increases when a pressure exceeding a predetermined pressure is applied thereto; electrodes formed on both side surfaces of the conductive rubber to measure a current flowing through the conductive rubber; and elastic rubber formed on a top surface of at least one of the electrodes to disperse pressure applied to the conductive rubber.

According to another aspect of the present invention, there is provided a manufacturing method of a pressure sensor for electronic skin, including: forming electrodes on both side surfaces of conductive rubber that increases in conductivity when a pressure exceeding a predetermined pressure is applied to the conductive rubber; and forming an elastic rubber on a top surface of one of the electrodes to dispersing pressure applied to the conductive rubber.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 3:
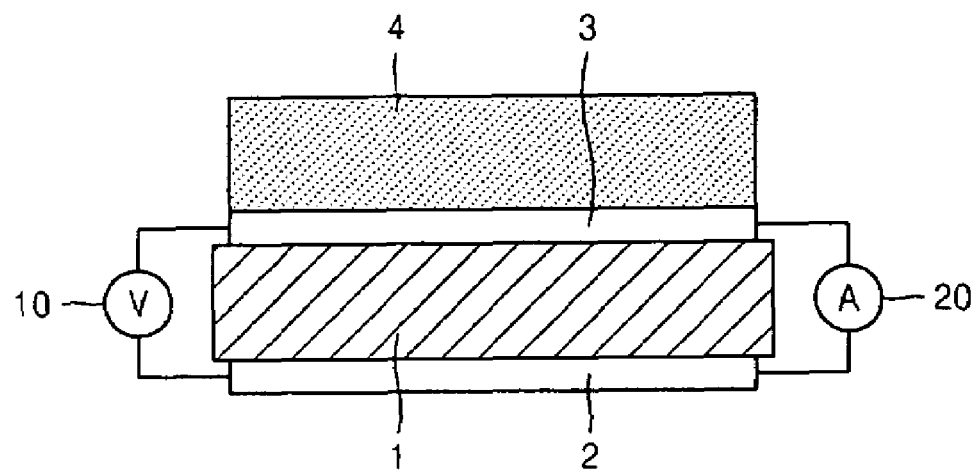
FIG. 3 is a schematic view of an analog pressure sensor for electronic skin according to an embodiment of the present invention.
Figure 4:
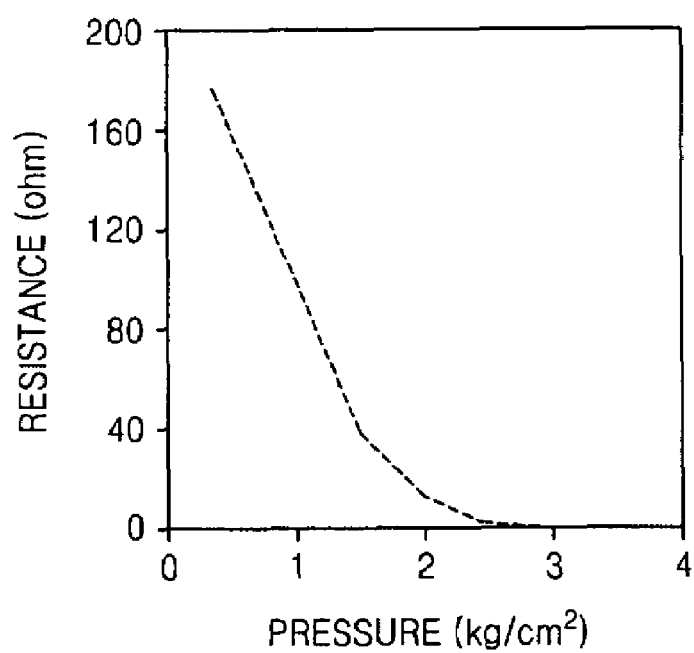
FIG. 4 is a graph illustrating the output characteristics of the analog pressure sensor for electronic skin of FIG. 3.

FIG. 3 is a schematic view of an analog pressure sensor for electronic skin according to an embodiment of the present invention, and FIG. 4 is a graph illustrating the output characteristics of the analog pressure sensor for electronic skin of FIG. 3.

Referring to FIG. 3, the analog pressure sensor for electronic skin includes pressure-activated conductive rubber 1, electrodes 2 and 3, elastic rubber 4, a voltmeter 10, and an ammeter 20.

The elastic rubber 4 is a material that allows the pressure-activated conductive rubber 1 to react gently to pressure. That is, the elastic rubber 4 disperses pressure applied to the pressure-activated conductive rubber 1.

Considering the previous example of a robotic arm, when the analog pressure sensor of the present embodiment is installed on the fingertips of the robotic arm and an object is held between the fingers, the pressure applied to the pressure-activated conductive rubber 1 is dispersed by the elastic rubber 4 according to the distance x that the rubber is depressed so that a more precise measurement of the pressure intensity can be taken. If k1 is the elastic constant of the pressure-activated conductive rubber 1, k2 is the elastic constant of the elastic rubber 4, x is the total distance pressed when an object is grasped, and x1 and x2 are the respective depressed distances of the pressure-activated conductive rubber 1 and the elastic rubber 4, the following equations 2 and 3 may apply.

$$x = x1 + x2 \quad \text{Equation 2}$$

$$k1 x1 = k2 x2 \quad \text{Equation 3}$$

The pressure that causes the change in conductivity increases according to x1, but the actual distance pressed (x) is distributed between x1 and x2 so that a change in resistance according to a change in the amount the pressure-activated conductive rubber 1 is depressed (or thicknesses of the pressure-activated conductive rubber and the two rubber layers) becomes more sensitive, as shown in Equation 2.

Figure 1:
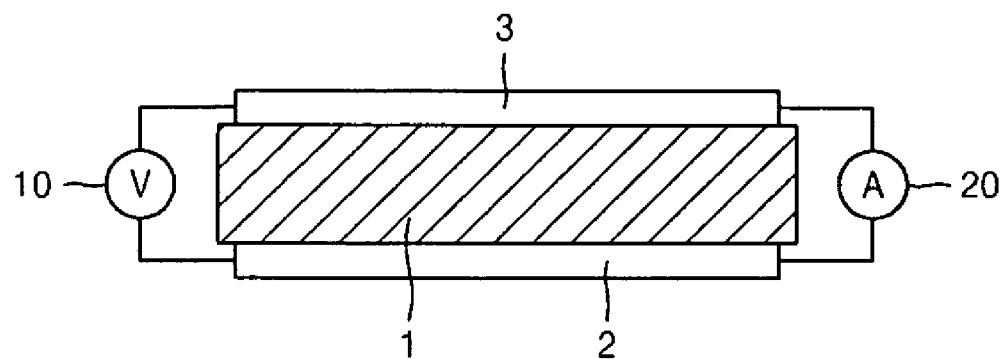
FIG. 1 is a schematic view of a conventional pressure sensor using pressure-activated conductive rubber.
Figure 2:
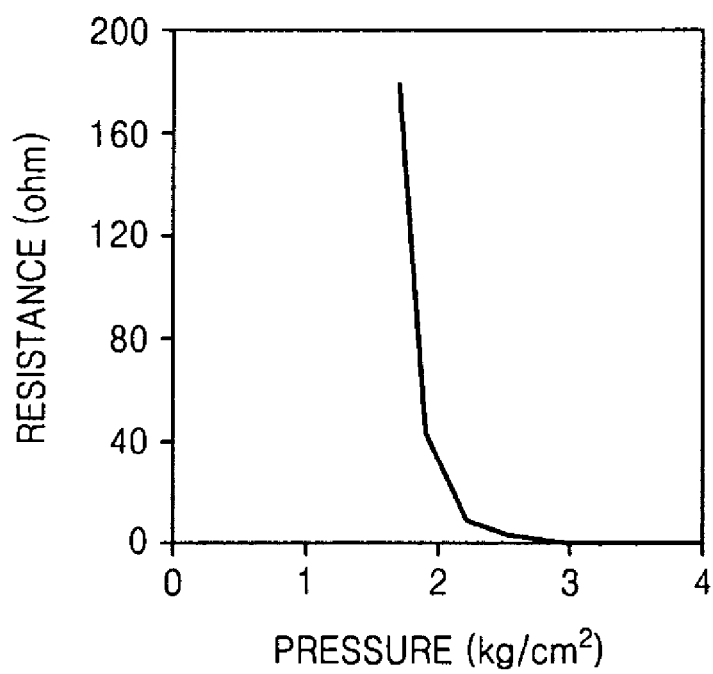
FIG. 2 is a graph illustrating the output characteristics of the pressure sensor of FIG. 1.

Referring to FIG. 4, it can be seen that the output characteristics of the analog pressure sensor according to an embodiment of the present invention are more gentle than those illustrated in FIG. 2. Thus, the pressure intensity according to a change in the amount of depression may be measured, and the analog pressure sensor of FIG. 3 may be used in electronic skin.

Figure 5:
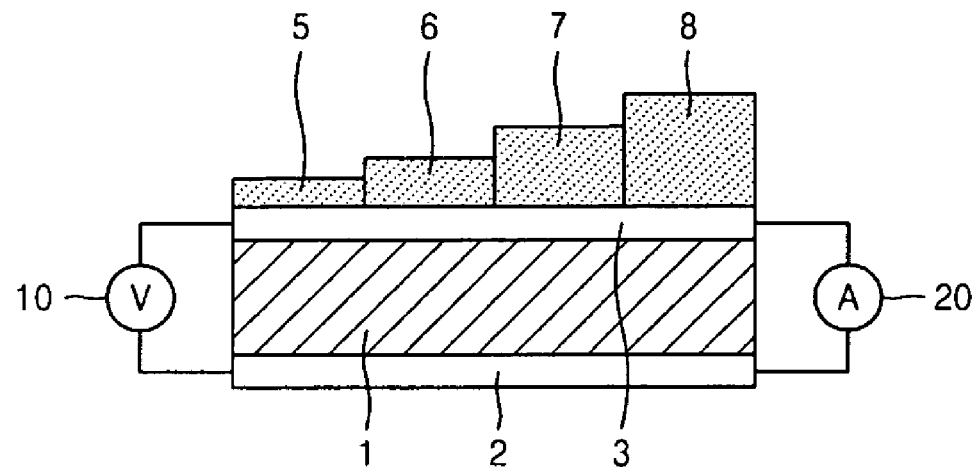
FIG. 5 is a schematic view of a digital pressure sensor for electronic skin according to an embodiment of the present invention.

FIG. 5 is a schematic view of a digital pressure sensor for electronic skin according to an embodiment of the present invention. Referring to FIG. 5, the digital pressure sensor for electronic skin includes pressure-activated conductive rubber 1, electrodes 2 and 3, first elastic rubber 5, second elastic rubber 6, third elastic rubber 7, fourth elastic rubber 8, a voltmeter 10, and an ammeter 20.

The first, second, third, and fourth elastic rubber 5, 6, 7, and 8 in FIG. 5 have different thicknesses. Here, each of the first through fourth elastic rubber 5 through 8, like the elastic rubber 4 shown in FIG. 3, interact with the pressure-activated conductive rubber 1 to function as an analog sensor. However, the first elastic rubber 5, the second elastic rubber 6, the third elastic rubber 7, and the fourth elastic rubber 8 have respectively different thicknesses so that they can function as a digital pressure sensor for electronic skin that abruptly changes in conductivity when predetermined pressures are applied thereto, as shown by the step graph shown in FIG. 7.

Here, the elastic rubber is divided into four pieces—the first, second, third, and fourth elastic rubber 5, 6, 7, and 8, but the number of pieces of elastic rubber may be varied. By varying the thicknesses of the pieces of elastic rubber, the conductive properties may be varied so that pressure intensity may be divided and measured with various preciseness according to the number of pieces of elastic rubber used.

Figure 6:
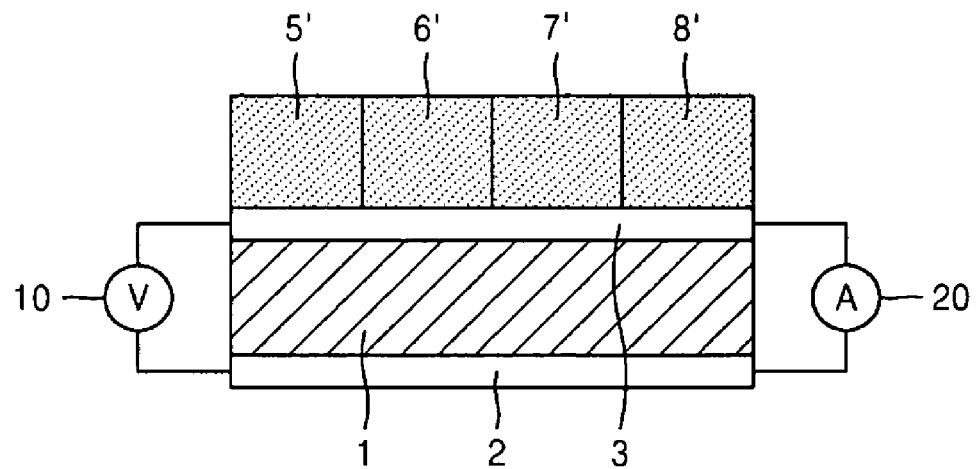
FIG. 6 is a schematic view of a digital pressure sensor for electronic skin according to another embodiment of the present invention.

FIG. 6 is a schematic view of a digital pressure sensor for electronic skin according to another embodiment of the present invention. Referring to FIG. 6, the digital pressure sensor for electronic skin includes pressure-activated conductive rubber 1, electrodes 2 and 3, first elastic rubber 5', second elastic rubber 6', third elastic rubber 7', fourth elastic rubber 8', a voltmeter 10, and an ammeter 20.

The elastic constants of the first, second, third, and fourth elastic rubber 5', 6', 7', and 8' are different.

Figure 7:
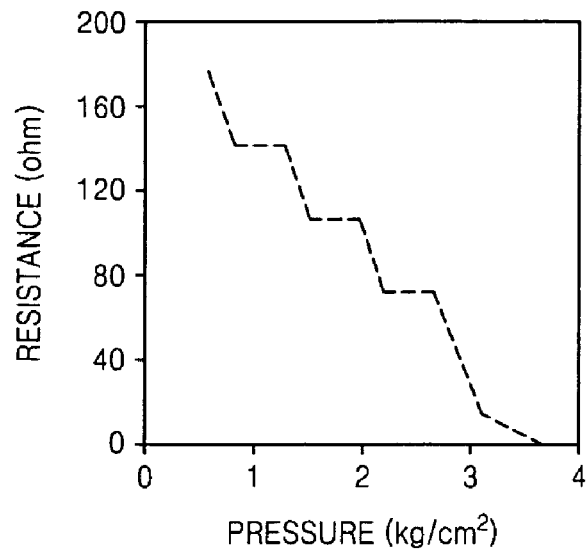
FIG. 7 is a graph illustrating the output characteristics of the digital pressure sensors for electronic skin of FIGS. 5 and 6.

In the current embodiment, the elastic rubber 5', 6', 7', and 8' are, by themselves, analog sensors, but when the elastic rubber 5', 6', 7', and 8' are combined, they function as a digital pressure sensor for electronic skin for which conductivity abruptly changes when a predetermined pressure is applied thereto according to the number of pieces of elastic rubber, as shown by the step graph illustrated in FIG. 7.

The conductivity of the pressure-activated conductive rubber 1 increases as each sensor (the elastic rubber 5', 6', 7', and 8') reaches a predetermined pressure, and the greater the number of sensors there is, the smaller the increments in resistance. The pressure corresponding to the number of sensors activated can be read.

Figure 8:
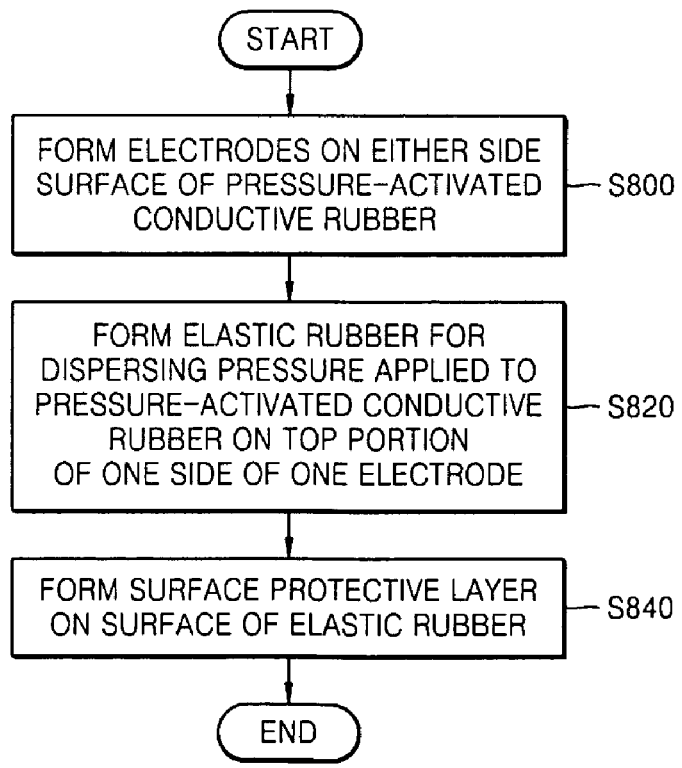
FIG. 8 is a flowchart of a manufacturing method of a pressure sensor for electronic skin according to an embodiment of the present invention.

FIG. 8 is a flowchart of a manufacturing method of a pressure sensor for electronic skin according to an embodiment of the present invention. Referring to FIG. 8, first, electrodes are formed on either side surface of conductive rubber whose conductivity increases when a pressure exceeding a predetermined pressure is applied thereto (operation S800).

Next, elastic rubber for dispersing pressure applied to the conductive rubber is formed on the surface of one of the electrodes (operation S820).

Subsequently, a protective layer for protecting the surface of the elastic rubber is formed on the surface of the elastic rubber (operation S840). The protective layer for protecting the surface of the elastic rubber may be a plastic film.

Aspects not described with reference to FIG. 8 have already been addressed by the descriptions related to FIGS. 3 through 7.

The present invention is capable of forming electronic skin that is similar to human skin in its ability to measure pressure intensity, which conventional pressure sensors using pressure-activated conductive rubber are incapable of doing.

The invention can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A pressure sensor for electronic skin, comprising:
   conductive rubber having a conductivity that increases when a pressure exceeding a predetermined pressure is applied thereto;
   electrodes formed on both side surfaces of the conductive rubber to measure a current flowing through the conductive rubber; and
   elastic rubber formed on a top surface of at least one of the electrodes to disperse pressure applied to the conductive rubber, wherein the elastic rubber is formed in an array of pieces of elastic rubber with the same elastic constant and different thicknesses.

2. The pressure sensor of claim 1, wherein the elastic rubber includes a protective layer forming a surface to protect the elastic rubber.

3. The pressure sensor of claim 2, wherein the protective layer is a plastic film.

4. The pressure sensor of claim 1, wherein the elastic rubber is natural rubber.

5. The pressure sensor of claim 1, wherein the elastic rubber is synthetic rubber.

6. The pressure sensor of claim 1, wherein the elastic rubber has an additive or uses foaming characteristics to ensure high elasticity.

7. A pressure sensor for electronic skin, comprising: conductive rubber having a conductivity that increases when a pressure exceeding a predetermined pressure is applied thereto; electrodes formed on both side surfaces of the conductive rubber to measure a current flowing through the conductive rubber; and elastic rubber formed on a top surface of at least one of the electrodes to disperse pressure applied to the conductive rubber, wherein the elastic rubber is formed in an array of pieces of elastic rubber with the same thickness and different elastic constants.

8. A manufacturing method of a pressure sensor for electronic skin, comprising:
   forming electrodes on both side surfaces of conductive rubber that increases in conductivity when a pressure exceeding a predetermined pressure is applied to the conductive rubber; and
   forming an elastic rubber on a top surface of one of the electrodes to dispersing pressure applied to the conductive rubber, wherein the elastic rubber is formed in an array of pieces of elastic rubber with the same elastic constant and different thicknesses.

9. The manufacturing method of claim 8, further comprising forming a protective layer on a surface of the elastic rubber to protect the elastic rubber.

10. A manufacturing method of a pressure sensor for electronic skin, comprising: forming electrodes on both side surfaces of conductive rubber that increases in conductivity when a pressure exceeding a predetermined pressure is applied to the conductive rubber; and forming an elastic rubber on a top surface of one of the electrodes to dispersing pressure applied to the conductive rubber wherein the elastic rubber is formed in an array of pieces of elastic rubber with the same thickness and different elastic constants.

* * * * *